(12) United States Patent
Morimura

(10) Patent No.: US 8,944,731 B2
(45) Date of Patent: Feb. 3, 2015

(54) COOLING STRUCTURE FOR MACHINE TOOL MAIN SPINDLE

(75) Inventor: Shoichi Morimura, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 954 days.

(21) Appl. No.: 13/093,075

(22) Filed: Apr. 25, 2011

(65) Prior Publication Data

US 2011/0280679 A1   Nov. 17, 2011

(30) Foreign Application Priority Data

May 17, 2010   (JP) .................................. 2010-113456

(51) Int. Cl.
  *B23Q 11/12*   (2006.01)
(52) U.S. Cl.
  CPC .................................... *B23Q 11/127* (2013.01)
  USPC .......................................... 409/135; 409/231
(58) Field of Classification Search
  CPC ............................ B23Q 11/127; B23Q 11/128
  USPC .................... 409/135, 136, 231; 384/476, 321
  IPC ........................................................ B23Q 11/12
  See application file for complete search history.

(56) References Cited

U.S. PATENT DOCUMENTS

| | | | | |
|---|---|---|---|---|
| 4,602,874 A | * | 7/1986 | Neugebauer | .................. 384/476 |
| 5,192,139 A | * | 3/1993 | Hiramoto et al. | ............. 384/476 |
| 2005/0134125 A1 | | 6/2005 | Kim | |
| 2009/0263202 A1 | | 10/2009 | Takashima et al. | |

FOREIGN PATENT DOCUMENTS

| | | | |
|---|---|---|---|
| CN | 1630166 A | | 6/2005 |
| CN | 2853241 Y | | 1/2007 |
| CN | 101561046 A | | 10/2009 |
| DE | 2346480 A | * | 4/1975 |
| DE | 3443537 C2 | * | 6/1986 |
| FR | 2573689 A | * | 5/1986 |
| JP | 06-031585 A1 | | 2/1994 |
| JP | 07-009300 A1 | | 1/1995 |
| JP | 07-106534 B2 | | 11/1995 |
| JP | 09-317778 A1 | | 12/1997 |
| JP | 10113845 A | * | 5/1998 |
| JP | 2000-213490 A1 | | 8/2000 |

(Continued)

OTHER PUBLICATIONS

EPO website machine translation of FR 2573689, printed Jun. 2014.*

(Continued)

*Primary Examiner* — Daniel Howell
(74) *Attorney, Agent, or Firm* — Burr & Brown, PLLC

(57) ABSTRACT

A coolant supply section that supplies coolant to a main spindle and a coolant recovery section that recovers the coolant from the main spindle are formed in a housing. A coolant flow path that allows the coolant to flow from the coolant supply section to the coolant recovery section is formed in the main spindle. The coolant flow path in the main spindle includes a coolant receiving portion that receives the coolant supplied from the coolant supply section, and a plurality of hole-shaped flow paths formed to extend in the axial direction of the main spindle from the coolant receiving portion. The coolant receiving portion includes an annular groove that is recessed in the outer circumference of the main spindle. The hole-shaped flow paths are formed to extend generally straight toward the coolant recovery section and with an inclination to the radially outer side of the main spindle.

8 Claims, 3 Drawing Sheets

(56) References Cited

FOREIGN PATENT DOCUMENTS

| JP | 2000296439 A | * | 10/2000 |
| JP | 2001-310210 A1 | | 11/2001 |
| JP | 2002066874 A | * | 3/2002 |
| SU | 1135559 A | * | 1/1985 |
| SU | 1459895 A | * | 2/1989 |

OTHER PUBLICATIONS

Proquest machine translation of DE 3443537, printed Jun. 2014.*
Chinese Office Action (Application No. 201110124602.4) dated Apr. 2, 2014.
Japanese Office Action (Application No. 2010-113456) dated Oct. 15, 2013.

* cited by examiner

COOLING STRUCTURE FOR MACHINE TOOL MAIN SPINDLE

BACKGROUND OF THE INVENTION

This application claims the entire benefit of Japanese Patent Application No. 2010-113456 filed on May 17, 2010 the entirety of which is incorporated by reference.

1. Field of the Invention

The present invention relates to a cooling structure for a machine tool main spindle supported by a plurality of bearings so as to be rotatable, and more particularly to a cooling structure for a main spindle that rotates at a high speed, such as for a machining center, for example.

2. Description of Related Art

In recent years, the rotational speed of a main spindle of a machine tool, in particular a main spindle of a machining center, has become higher. Therefore, the amount of heat produced by bearings is becoming larger, which adversely affects the thermal stability of the main spindle and the tool, and so forth. Against such a background, it is necessary to cool the bearings from both the inner race side and the outer race side in order to enhance the thermal stability of the tool and suppress an increase in surface pressure due to the difference between the temperatures of the inner race and the outer race of the bearings. Thus, cooling structures in which the main spindle is directly cooled to cool the inner race side of the bearings in order to reduce the difference between the temperatures of the inner race and the outer race of the bearings have been developed.

In some cooling structures according to the related art in which coolant is introduced into the main spindle, a centrifugal force due to rotation of the main spindle is utilized. For example, Japanese Examined Patent Application Publication Number H07-106534 discloses a configuration in which coolant is delivered to a coolant supply passage formed along the axis of a drawbar to cool a rotor and an axial center of the drawbar and then be recovered. Japanese Patent Application Publication Number H07-9300 discloses a structure in which coolant is supplied from an intermediate location between a front bearing and a rotor and in which a flow path extending to the radially outer side of a main spindle is formed.

Meanwhile, Japanese Patent Application Publication Number H09-317778 discloses a configuration in which a centrifugal force is not utilized. In the configuration, a flow path extending from the radially outer side of a main spindle to the radially inner side of the main spindle, then extending in the longitudinal direction under a bearing, and extending to the radially outer side is formed to cool the inner race of the bearing for the main spindle.

In the technology disclosed in Japanese Examined Patent Application Publication Number H07-106534 described above, however, it is necessary to supply the coolant from the rear end of the main spindle with a small diameter, which imposes limitations on the location of supply of the coolant. In addition, the flow path is longer than necessary, which increases the number of constituent parts and leads to imbalance. The technology disclosed in Japanese Patent Application Publication Number H07-9300 uses a nozzle to supply the coolant from the radially inner side of the main spindle. This increases the number of constituent parts, which leads to a cost increase. In addition, the use of the nozzle does not allow the coolant to be efficiently fed into the main spindle, which deteriorates the cooling efficiency.

The technology disclosed in Japanese Patent Application Publication Number H09-317778 is advantageous in terms of the cost and the degree of freedom in design because the coolant flows only through a desired portion to be cooled. However, the coolant flows through a hole-shaped flow path extending from the radially outer side to the radially inner side of the main spindle. Thus, when the main spindle is rotating at a high speed, the coolant is subjected to a large centrifugal force, and it is necessary to apply a high pressure to the coolant in order to cause the coolant to flow to the radially inner side. Therefore, a seal structure that prevents leakage of the coolant is required, which complicates the cooling structure.

SUMMARY OF THE INVENTION

In view of the foregoing circumstances, it is therefore an object of the present invention to provide a cooling structure for a machine tool main spindle that can cool the main spindle and bearings in a simple structure.

In order to address the foregoing issues, a first aspect of the present invention provides a cooling structure for a machine tool main spindle that cools a main spindle mounted to a housing via a plurality of bearings so as to be rotatable, in which a coolant supply section that supplies coolant to the main spindle and a coolant recovery section that recovers the coolant from the main spindle are formed in the housing at portions corresponding to a portion of the main spindle to be cooled, and an in-main spindle coolant flow path extending from the coolant supply section to the coolant recovery section is formed in the main spindle; the in-main spindle coolant flow path includes a coolant receiving portion that receives the coolant supplied from the coolant supply section and a plurality of hole-shaped flow paths formed to extend in an axial direction of the main spindle from the coolant receiving portion; and the coolant receiving portion includes an annular groove that is recessed in an outer circumference of the main spindle.

According to the configuration, the coolant receiving portion includes the annular groove formed in the outer circumference of the main spindle, and the hole-shaped flow paths are formed to extend in the axial direction of the main spindle from the groove. Thus, when the coolant is supplied from the outside to the rotating main spindle, the coolant can reach the hole-shaped flow paths under little influence of the centrifugal force. Such a configuration allows the coolant to circulate without applying a high supply pressure to the coolant supply section. The configuration also allows the coolant to flow only through a desired portion to be cooled through a short flow path, which reduces the limitations imposed on the structure of the coolant supply section and the flow path, and makes it possible to cool a portion required to be cooled in order to cool the bearings with a simple configuration.

A second aspect of the present invention provides the cooling structure for a machine tool main spindle according to the first aspect, in which the coolant supply section includes a plurality of coolant supply holes, and a supply port that discharges the coolant to an inside portion of the housing that faces the annular groove is provided at an end of each of the coolant supply holes; and each of the coolant supply holes is formed to extend with an inclination in a rotational direction of the main spindle from the supply port to the other end.

According to the configuration, the influence of the centrifugal force generated by rotation of the main spindle can be reduced, and the coolant can be supplied even when the main spindle is rotating at a high speed.

A third aspect of the present invention provides the cooling structure for a machine tool main spindle according to the first or second aspect, in which the supply port is formed to have a diameter that is smaller than an opening width of the annular groove, and positioned to face generally a center of the annular groove.

According to the configuration, the coolant can be supplied to the center portion at which the centrifugal force applied to the coolant filling the annular groove is smallest, which minimizes the influence of the centrifugal force.

A fourth aspect of the present invention provides the cooling structure for a machine tool main spindle according to any one of the first to third aspects, in which an air seal device in a ring-shaped configuration is disposed in the housing at each of portions sandwiching the annular groove to prevent leakage of the coolant.

According to the configuration, because the coolant receiving portion is an annular groove and thus formed in a simple annular structure, good shielding of the coolant receiving portion by air can be provided, which allows shielding of the coolant with an inexpensive structure.

According to the present invention, the coolant receiving portion includes the annular groove formed in the outer circumference of the main spindle, and the hole-shaped flow paths are formed to extend in the axial direction of the main spindle from the groove. Thus, when the coolant is supplied from the outside to the rotating main spindle, the coolant can reach the hole-shaped flow paths under little influence of the centrifugal force. This allows the coolant to circulate without applying a high supply pressure to the coolant supply section, which reduces the limitations imposed on the structure of the coolant supply section, and makes it possible to cool a portion required to be cooled in order to cool the bearings with a simple configuration.

DETAILED DESCRIPTION OF THE INVENTION

Figure 1:
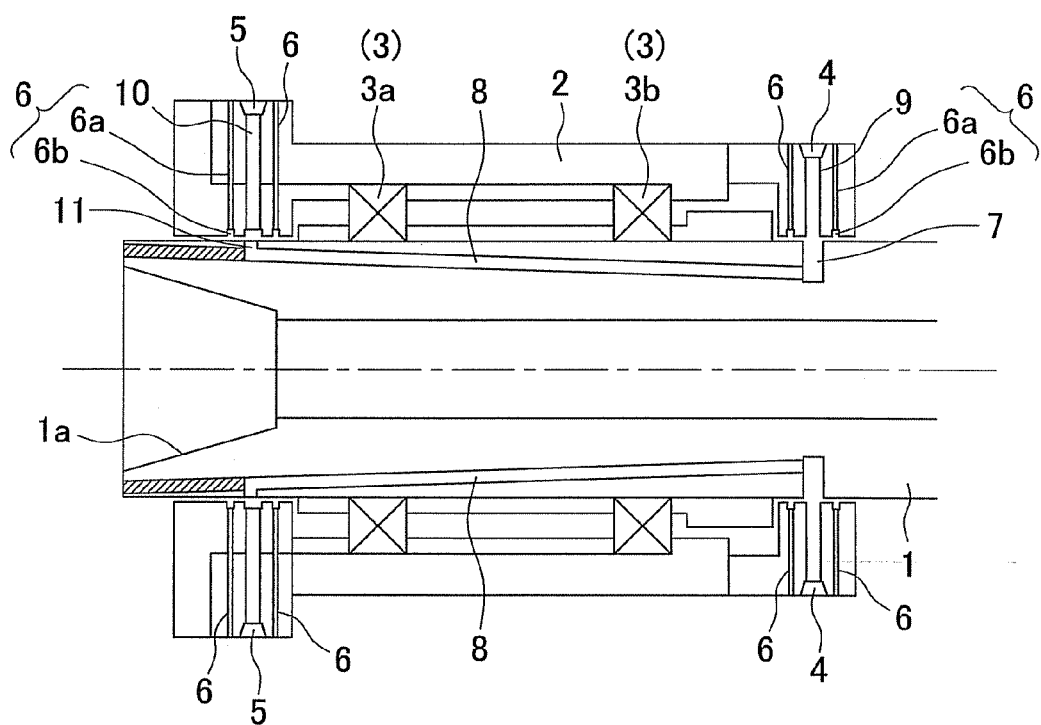
FIG. 1 is a cross-sectional explanatory view showing a cooling structure for a machine tool main spindle according to an embodiment of the present invention.

An embodiment of the present invention will be described in detail below with reference to the drawings. FIG. 1 is a cross-sectional view showing a cooling structure for a machine tool main spindle according to an embodiment of the present invention. Reference numeral 1 denotes a main spindle, 2 denotes a housing that supports the main spindle 1, 3 denotes front bearings (a first front bearing 3a and a second front bearing 3b), 4 denotes a coolant supply section, 5 denotes a coolant recovery section, 6 denotes an air seal portion that prevents leakage of coolant, 7 denotes a coolant receiving portion that receives the supplied coolant, and 8 denotes a hole-shaped flow path formed in a portion of the main spindle 1 to be cooled.

The main spindle 1 has a tapered hole 1a for attachment of a tool at the distal end, and is supported on the housing 2 via the first and second front bearings 3a and 3b and a rear bearing (not shown) so as to be rotatable. The coolant receiving portion 7 includes an annular groove formed in rear of the second bearing 3b in the shape of a ring with a rectangular cross section.

The hole-shaped flow path 8 is formed to extend straight from a wall surface of the coolant receiving portion 7 to a location in front of the first bearing 3a. The hole-shaped flow path 8 is formed to extend with an inclination to the radially outer side of the main spindle 1 toward the front. A plurality of hole-shaped flow paths 8 are formed in the vicinity of the surface of the main spindle 1.

The distal end of the hole-shaped flow path 8 is coupled to an outlet hole 11 formed by drilling in a portion of the side surface of the main spindle 1 that faces the coolant recovery section 5 formed in the housing 2. The coolant is delivered from the outlet hole 11 to the coolant recovery section 5.

Figure 2:
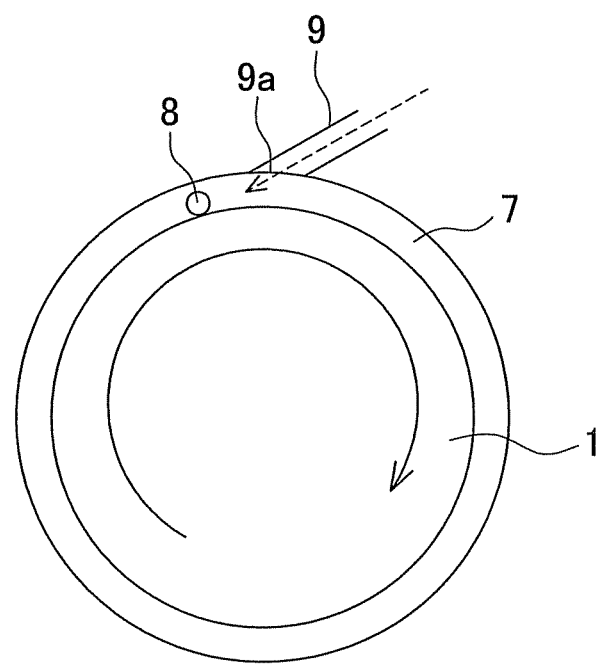
FIG. 2 is a schematic view showing the configuration of a coolant supply hole.

The coolant supply section 4 includes a coolant supply hole 9 that supplies coolant supplied from a coolant supply source (not shown) to the coolant receiving portion 7. FIG. 2 schematically shows the configuration of the coolant supply hole 9. As shown in FIG. 2, the coolant supply hole 9 is formed to extend from the side surface of the housing 2 toward the coolant receiving portion 7, not radially (in the radial direction of the main spindle 1) but with an inclination in the rotational direction of the main spindle 1 from a supply port 9a facing the coolant receiving portion 7 toward the side surface of the housing 2 in the rear. A plurality of coolant supply holes 9 are formed around the housing 2 at appropriate intervals.

With the coolant supply hole 9 formed with an inclination in the rotational direction of the main spindle 1 as described above, the influence of the centrifugal force generated by rotation of the main spindle 1 can be reduced, and the coolant can be supplied against the centrifugal force even when the main spindle 1 is rotating at a high speed.

Figure 3:
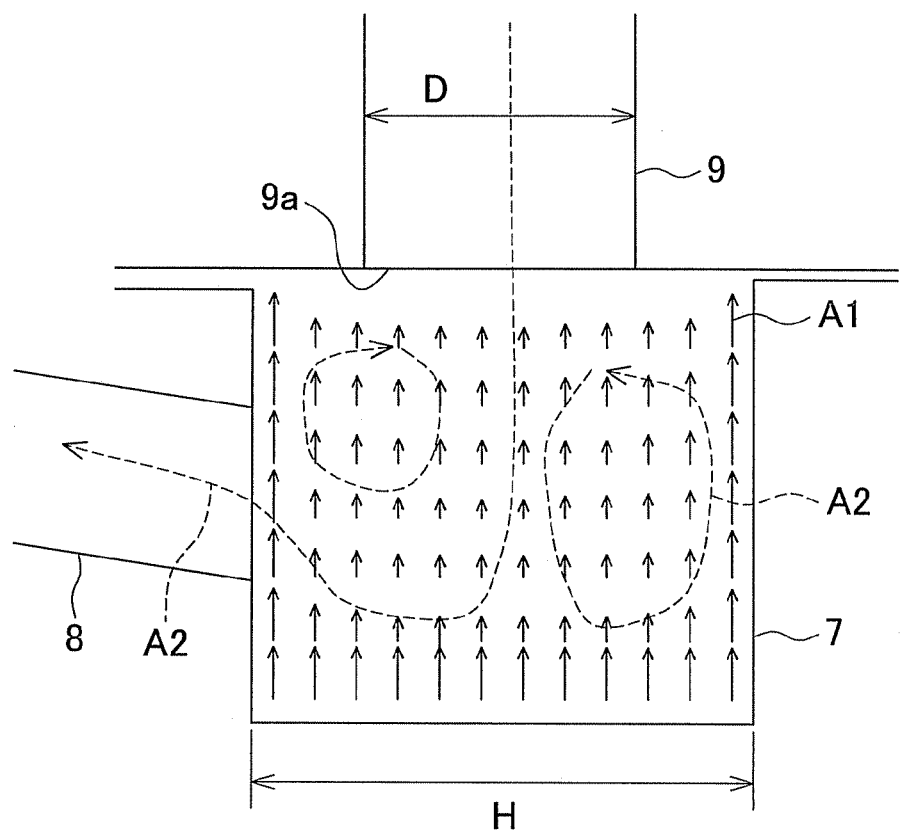
FIG. 3 is an explanatory view showing the relationship between an annular groove and a supply hole.

The annular groove of the coolant receiving portion 7 is formed to have a width that is larger than that of the supply port 9a of the coolant supply hole 9, and disposed with the supply port 9a positioned at the center of the opening of the coolant receiving portion 7. FIG. 3 shows the relationship between the coolant receiving portion 7 and the supply port 9a formed as described above. In FIG. 3, H indicates the opening width of the coolant receiving portion 7, and D indicates the opening width of the supply port 9a of the coolant supply hole 9, with H being larger than D. In addition, the arrows A1 indicate the magnitude of the centrifugal force of the coolant filling the coolant receiving portion 7, and the arrows A2 indicate the flow of the coolant. As shown in FIG. 3, the coolant rotates at substantially the same speed as the rotational speed of the main spindle 1 to be subjected to a large centrifugal force in the vicinity of the walls of the coolant receiving portion 7. Meanwhile, the coolant rotates at a speed that is lower than the rotational speed of the main spindle 1 to be subjected to a small centrifugal force in the vicinity of the center portion of the coolant receiving portion 7, which is located away from the walls of the coolant receiving portion 7.

The coolant recovery section 5 includes a plurality of coolant recovery holes 10 formed at a portion facing the outlet hole 11 of the main spindle 1, that is, in front of the first bearing 3a, and disposed at appropriate intervals. The coolant recovery section 5 is configured to return the recovered coolant to the coolant supply source (not shown).

The air seal portion 6 includes a plurality of seal air supply holes 6a that supply air from an external air supply source (not shown), and a plurality of seal air discharge ports 6b that form an air shielding on the main spindle 1 and that are disposed in a ring-shaped configuration. The air seal portion 6 is provided for the coolant supply holes 9 and also provided for the coolant recovery holes 10.

The air seal portion 6 includes a plurality of seal air supply holes 6a that supply air from an external air supply source (not shown), and a plurality of seal air discharge ports 6b that form an air shield on the main spindle 1 and that are disposed in a ring-shaped configuration. The air seal portion 6 is provided for the coolant supply holes 9 and also provided for the coolant recovery holes 10.

In the thus configured cooling structure, coolant flows as follows to yield the cooling effect. Coolant supplied from a coolant source to the coolant supply section 4 is supplied from the supply port 9a of the coolant supply hole 9 to the coolant receiving portion 7. In general, oil with a low viscosity is used as the coolant. Inside the coolant receiving portion 7, as described above, the coolant rotates at substantially the same speed as the rotational speed of the main spindle 1 in the vicinity of the walls of the coolant receiving portion 7, but rotates at a speed that is lower than the rotational speed of the main spindle 1 to be subjected to a small centrifugal force in the center portion of the coolant receiving portion 7. Therefore, the influence of the centrifugal force can be reduced by disposing the supply port 9a to face the center of the opening of the coolant receiving portion 7, and by disposing the coolant supply hole 9 with an inclination. Thus, the coolant can be supplied without applying a high pressure to the coolant supply section 4 even when the main spindle 1 is rotating at a high speed.

The coolant thus supplied to the coolant receiving portion 7 sequentially passes through the hole-shaped flow path 8, the outlet hole 11, and the coolant recovery hole 10 to return to the coolant source. In this event, inside the hole-shaped flow path 8, the coolant is forcibly subjected to a centrifugal force that is proportional to the rotational speed of the main spindle 1, irrespective of the viscosity of the coolant. Since the hole-shaped flow path 8 is formed to extend radially outwardly of the main spindle 1 toward the outlet hole 11, the centrifugal force becomes larger toward the distal end. Hence, the coolant is subjected to a force that causes the coolant to flow toward the outlet hole 11. As a result, the centrifugal force due to rotation of the main spindle 1 causes the coolant to flow in the forward direction in the coolant flow path, and to cool portions of the main spindle 1 to which the first bearing 3a and the second bearing 3b are attached, which efficiently cools the inner race side of the bearings 3 where heat is produced.

In addition, the coolant receiving portion 7 and the outlet hole 11, which are exposed on the surface of the main spindle 1, are sealed by the function of the air seal portion 6 provided on both the front and rear sides, and subjected to a low pressure when the coolant is supplied as described above. Thus, the coolant is unlikely to leak from a gap between the main spindle 1 and the housing 2.

As described above, the coolant receiving portion 7, which is provided in the outer circumference of the main spindle 1, is formed in an annular shape, and the hole-shaped flow path 8 is formed to extend in the axial direction of the main spindle 1 from the annular groove. Such a configuration allows the coolant to circulate without applying a high supply pressure to the coolant supply section 4. The configuration also allows the coolant to flow only through a desired portion to be cooled through a short flow path, which reduces the limitations imposed on the structure of the coolant supply section 4 and the flow path, and makes it possible to cool a portion required to be cooled in order to cool the bearings 3 with a simple configuration.

Moreover, .the supply port 9a of the coolant supply hole 9 is formed to be smaller than the opening width of the coolant receiving portion 7, and positioned to face the center portion of the coolant receiving portion 7. Thus, the coolant can be supplied to a location at which the centrifugal force applied to the coolant filling the coolant receiving portion 7 is smallest, which minimizes the influence of the centrifugal force.

Further, because the coolant receiving portion 7 is an annular groove and thus formed in a simple annular structure, good shielding of the coolant receiving portion 7 by air can be provided, which allows shielding of the coolant with an inexpensive structure.

The hole-shaped flow path 8 is not necessarily formed as a hole with a circular cross section, and may have any shape. Although the coolant flows from the rear side to the front side of the main spindle 1 in the embodiment described above, the coolant may flow in the opposite direction. Although the hole-shaped flow path 8 is formed as a hole extending radially outward in the embodiment described above, the hole-shaped flow path 8 may be formed to extend in parallel with the main spindle 1, in which case an auxiliary device such as an axial-flow pump may be provided.

Further, although the coolant supply hole 9 is formed with an inclination in the rotational direction of the main spindle 1, the coolant supply hole 9 may be formed to extend radially from the center of the main spindle 1 with no inclination. In the case with no inclination, the coolant is caused to flow utilizing the centrifugal force, which allows the coolant to flow when the main spindle 1 is rotating in the forward direction and in the reverse direction, irrespective of the rotational direction of the main spindle 1, unlike the case where an axial-flow pump or the like is used. Meanwhile, in the case where the coolant supply hole 9 is inclined in the forward direction as shown in FIG. 2, a coolant supply hole with an inclination in the reverse direction may additionally be formed to allow the coolant to suitably flow when the main spindle 1 is rotating in the forward direction and in the reverse direction by selectively using one of the coolant supply holes depending on the rotational direction of the main spindle 1.

What is claimed is:

1. A cooling structure for a machine tool main spindle that cools a main spindle mounted to a housing via a plurality of bearings so as to be rotatable, wherein a coolant supply section that supplies coolant to the main spindle and a coolant recovery section that recovers the coolant from the main spindle are formed in the housing at portions corresponding to a portion of the main spindle to be cooled, and the coolant flow path in the main spindle, extending from the coolant supply section to the coolant recovery section is formed in the main spindle; and the in-main spindle coolant flow path includes a coolant receiving portion having an annular groove shape that receives the coolant supplied from the coolant supply section and a plurality of hole-shaped flow paths formed to extend in an axial direction of the main spindle from a wall surface of the coolant receiving portion.

2. The cooling structure for a machine tool main spindle according to claim 1, wherein the coolant supply section includes a plurality of coolant supply holes, and a supply port that discharges the coolant to an inside portion of the housing that faces the annular groove is provided at an end of each of the coolant supply holes; and each of the coolant supply holes is formed to extend with an inclination in a rotational direction of the main spindle from the supply port to the other end.

3. The cooling structure for a machine tool main spindle according to claim 1, wherein the supply port is formed to have a diameter that is smaller than an opening width of the annular groove, and positioned to face generally a center of the annular groove.

4. The cooling structure for a machine tool main spindle according to claim 2, wherein
the supply port is formed to have a diameter that is smaller than an opening width of the annular groove, and positioned to face generally a center of the annular groove.

5. The cooling structure for a machine tool main spindle according to claim 1, wherein
an air seal device in a ring-shaped configuration is disposed in the housing at each of portions sandwiching the annular groove to prevent leakage of the coolant.

6. The cooling structure for a machine tool main spindle according to claim 2, wherein
an air seal device in a ring-shaped configuration is disposed in the housing at each of portions sandwiching the annular groove to prevent leakage of the coolant.

7. The cooling structure for a machine tool main spindle according to claim 3, wherein
an air seal device in a ring-shaped configuration is disposed in the housing at each of portions sandwiching the annular groove to prevent leakage of the coolant.

8. The cooling structure for a machine tool main spindle according to claim 4, wherein
an air seal device in a ring-shaped configuration is disposed in the housing at each of portions sandwiching the annular groove to prevent leakage of the coolant.

\* \* \* \* \*